July 9, 1968  D. H. EVANS  3,391,490
REMOTELY CONTROLLED VEHICLE SYSTEM
Filed Feb. 23, 1966  8 Sheets-Sheet 2

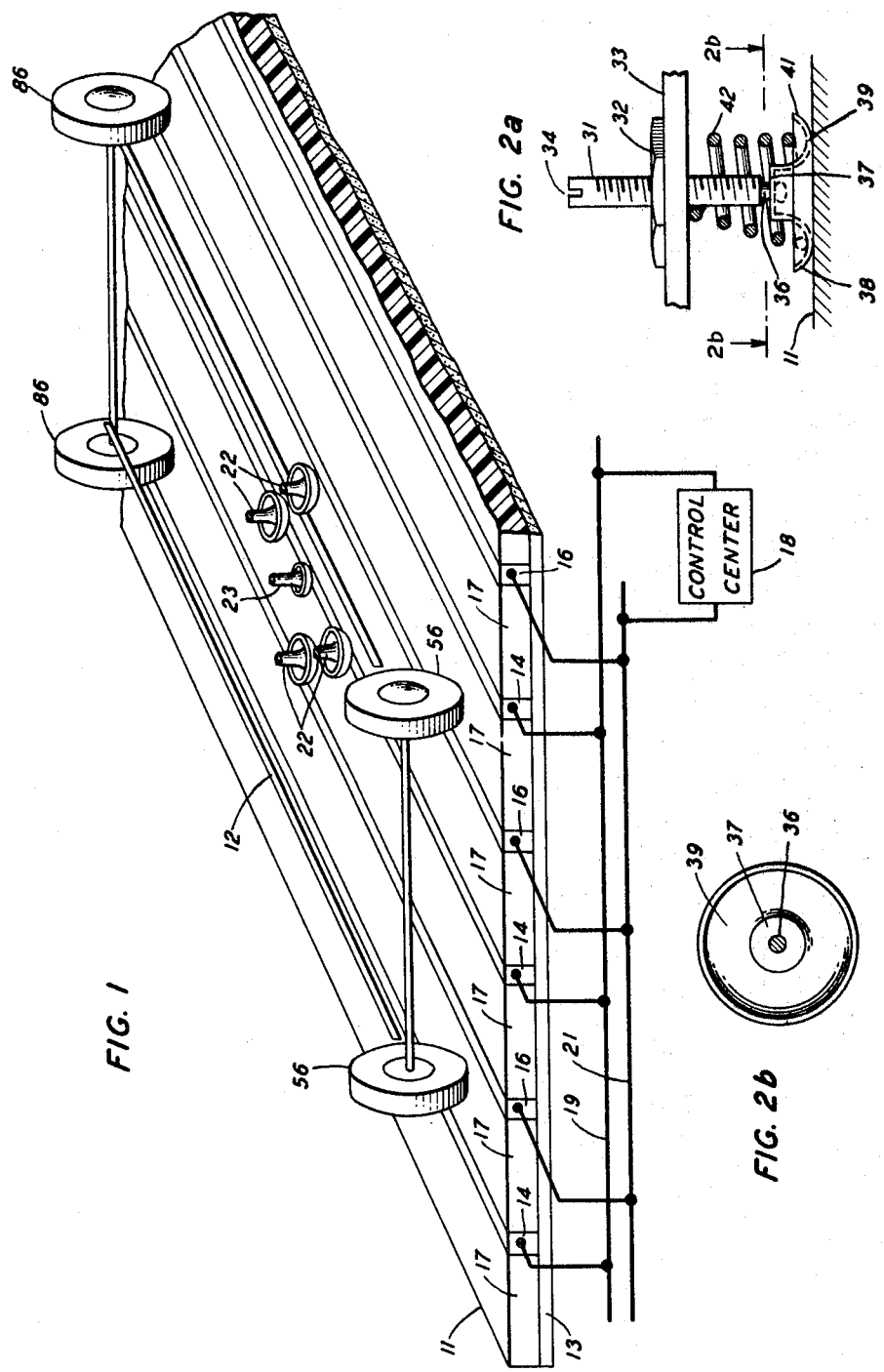

INVENTOR.
DAVID H. EVANS
BY
ATTORNEY

INVENTOR.
DAVID H. EVANS
BY
ATTORNEY

July 9, 1968  D. H. EVANS  3,391,490

REMOTELY CONTROLLED VEHICLE SYSTEM

Filed Feb. 23, 1966  8 Sheets-Sheet 6

INVENTOR.
DAVID H. EVANS
BY *David P. Kelley*
ATTORNEY

INVENTOR.
DAVID H. EVANS

60 C.P.S.
15 V.

LOAD

United States Patent Office 3,391,490
Patented July 9, 1968

3,391,490
REMOTELY CONTROLLED VEHICLE SYSTEM
David H. Evans, 2575 Walton Blvd.,
Rochester, Mich. 48063
Filed Feb. 23, 1966, Ser. No. 529,372
7 Claims. (Cl. 46—244)

This invention relates to remotely controlled vehicles and to methods for varying the speed and direction of these vehicles. More particularly, the present invention involves electrical control of one or a plurality of model vehicles by communication between the vehicles and the remote control unit by means of the driving surface upon which the vehicles move.

Control mechanisms for model vehicles have been known heretofore in which a wire lead extends from a power source to the model vehicles. Drive mechanisms are also known in which different radio frequencies are used to control the various model devices. The first of these drive mechanisms has the obvious disadvantage that the model vehicles drag the electrical connections along and the vehicles cannot pass each other or function in other than a parallel, and usually, a straight parallel, line or path without causing entanglement of the wire connections. In any event, the dragging lead wires do much to defeat the verisimilitude sought in the use of model vehicles. Prior art arrangements utilizing radio signals for control require the use of sets of transmitters and receivers, each set being tuned to a different frequency, and each receiver carrying vehicle also containing the necessary batteries and the like for power.

One prior art arrangement includes a model automobile which is electrically controlled from a remote vantage point, without connecting wires or radio sets, but the system employed is such that the toy vehicle can run only in the direction of the driving surface on which it is disposed. Too, it has been found that this linear system includes a pickup system disposed in the vehicle such that the model, in certain of the positions it achieves in use, either short circuits the roadway conductors or completely loses contact with them.

Other prior art arrangements include electrically controlled model vehicles which receive their electrical supply from a remote power source through the grooves and elevations of the surface on which the vehicles travel. The apparatus is so devised however that specific pickups of the vehicles come into contact only with the depressed, or elevated conductors of the driving surface, but not both. Thus distinctly different types of vehicles must be used. The resulting apparatus incorporates a complex mechanical arrangement and the pickup apparatus must incorporate a multitude of moveable parts, a particular disadvantage where the model vehicles are designed for use by children. Further, the effort to attain verisimilitude in such equipment is defeated by virtue of the apparatus required to secure the necessary control.

Still another prior art arrangement utilizes slotted track, the vehicle of necessity following the course of the slot and being controllable only as to velocity.

One illustrative embodiment of the present invention involves a model car for use on a specially adapted but verisimilar driving surface through which both the speed and direction of the vehicle are controlled from a remote power and control source.

Control from this remote source is accomplished by means which include electrical pickups positioned on the underside of the car body and extending to the driving surface. The driving surface is formed of uniform strips of an electrical conducting material, for example, copper, each such strip being insulated from its two neighboring strips. Alternating strips are connected electrically to a common conductor. The two conductors thus connected to the strips go to a common source, achieving, in effect, a two wire connection between the remote and optionally stationary power and control source and two electrical points in the car without actually having a conventional electrical cord involved. As contemplated by the invention, the connections may exist regardless of the position, direction, or speed of the model vehicle on the driving surface.

It is, accordingly, an object of the present invention to permit both directional and velocity control and other control, such as a tank turret, for example, of model vehicles without the necessity of diverse type vehicles, trailing cords, radio controls, or self-contained power supplies within the vehicles themselves.

It is also an object of the present invention to provide a model vehicle which is able to recreate the appearance and activity of an automobile or other vehicle while operating on a surface that itself closely resembles an ordinary roadway or like surface.

One of the principal features of the present invention is a model track and vehicle pickup arrangement which permits operation of the vehicle regardless of its directional orientation and which supplies both power and control signals to the vehicle or vehicles regardless of orientation. As a consequence, the vehicle or vehicles may be driven in circles, made to pass each other on either side, for example, or made to follow any course desired by the driver or operator.

Another feature of the present invention is the use of a bridge circuit within the vehicle which makes possible the use of any number of possible control systems without necessitating other than minor modifications in the vehicle. In addition, the bridge circuit assures that positive points on the roadway are connected to positive points in the vehicle, and insulated from negative points, and vice versa. When the polarity of a pickup changes during operation, the bridge circuit in effect functions as a switch within the vehicle.

Other objects and features of the invention will be explained or will be apparent from the following description thereof in connection with the accompanying drawings, in which:

FIG. 1 is a perspective diagrammatic view of one embodiment of the invention;

FIGS. 2a and 2b are views of a proposed pickup arrangement;

Figure 3A:
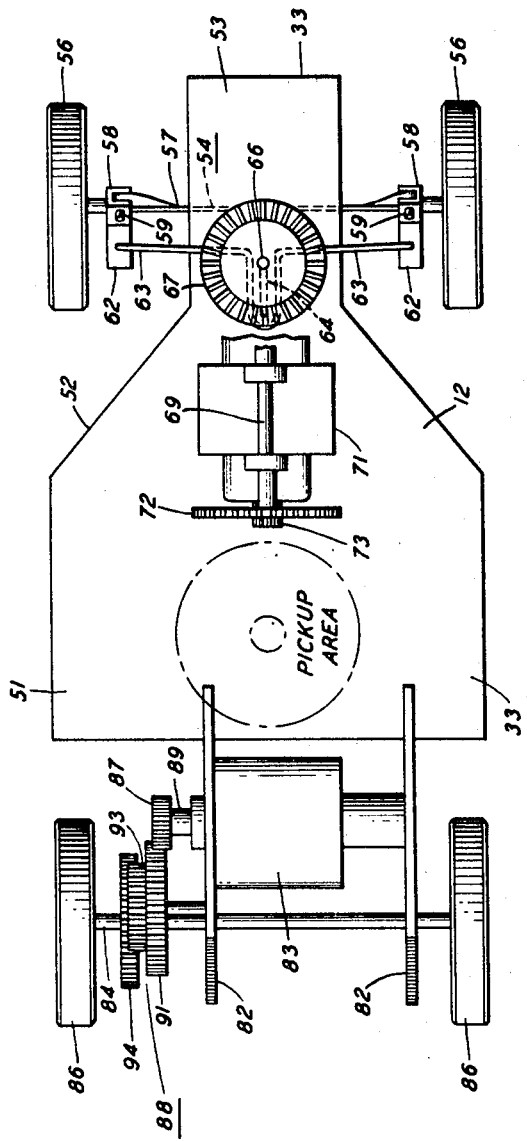
FIGS. 3a and 3b are plan and elevation views respectively of the chassis of a model vehicle for use with the invention.

In FIG. 1 one arrangement utilizing the principles of the present invention is depicted. The arrangement comprises a driving surface 11 and a wheeled model vehicle 12 which rides upon the surface 11, being held there through gravity and friction solely. For simplicity only a portion of the chassis of vehicle 12 is shown here.

Driving surface 11 comprises a base member 13 formed, for example, of fibreboard, on which are disposed a plurality of evenly spaced conductors 14, 16. Conductors 14, 16 may be, for example, HO gauge model railroad tracks, arranged parallel to each other on the base 13. The space between the conducting strips 14, 16 is filled with a suitable insulating material 17 such as an epoxy resin to the tops of the strips 14, 16, as shown, so that strips 14, 16 remain exposed, but a substantially flat driving surface is achieved. In FIG. 1, strips 14, 16 are shown straight. They may be, however, curved if desired, so long as they remain evenly spaced, or, as will be apparent hereinafter, symmetrical.

In a manner which will be explained more fully hereinafter, vehicle 12 is controlled both as to direction and velocity from a remote power source and control center 18, one side of which is connected through bus 19 to alternate conductors 14 and the other side of which is connected through bus 21 to alternate conductors 16, as shown.

Mounted on vehicle 12, by any suitable means, are a plurality of pickups 22, 23. One suggested configuration for pickups 22, 23 is shown in FIG. 2a and 2b. The pickup of FIGS. 2a and 2b comprises a threaded post 31 which passes through a threaded nut 32 which is affixed to plate 33 which forms part of the chassis of the vehicle 12. The upper end of post 31 has a notch 34 to permit adjusting the spacing of the bottom of post 31 from the roadway. The lower end of post 31 has a necked down unthreaded portion 36 which is loosely slip-fitted in an aperture 37 of a contact element 38. Element 38 is free to slide up and down on portion 36 and tilt with respect to the post so that pickup 38 readily adjusts itself to any unevenness or irregularities in the surface 11 without tilting the vehicle 12. The lower end of portion 36 is peened over so that element 38 cannot slip off the post 31. The fit of the element 38 to portion 36, while loose as noted in the foregoing, is nevertheless sufficiently tight to insure that the center of element 38 is substantially coincident with post 31 at all times and some portion of element 38 is in contact with post 31 at all times. Spring 42, which at its upper end is affixed to post 31, insure electrical contact between member 38 and post 31 at all times.

Element 38 is flared to produce an annular contact surface 39, and the outer rim 41 of element 38 is curved upwards, as shown, so that element 38 can ride over any irregularities in surface 11 without causing an abrupt stoppage of vehicle 12. In order that continuous contact between element 38 and surface 11 may be maintained during operation and despite irregularities in surface 11, a tapered coil spring 42 extends upward from the upper side of the annular contacting surface 39, fitting into the groove formed by the upward curvature of the rim 41, and is affixed to the post at the small end. The various elements of the pickup assembly are made of suitable conducting material. Plate 33 in this embodiment is of insulating material, such as a suitable plastic.

The pickup arrangement of FIGS. 2a and 2b is for purposes of illustration only. Various other arrangements are, of course, possible. As will be apparent hereinafter, it is essential that lateral motion of the pickup relative to the post or vehicle be minimized, regardless of the arrangement used.

Figure 3B:
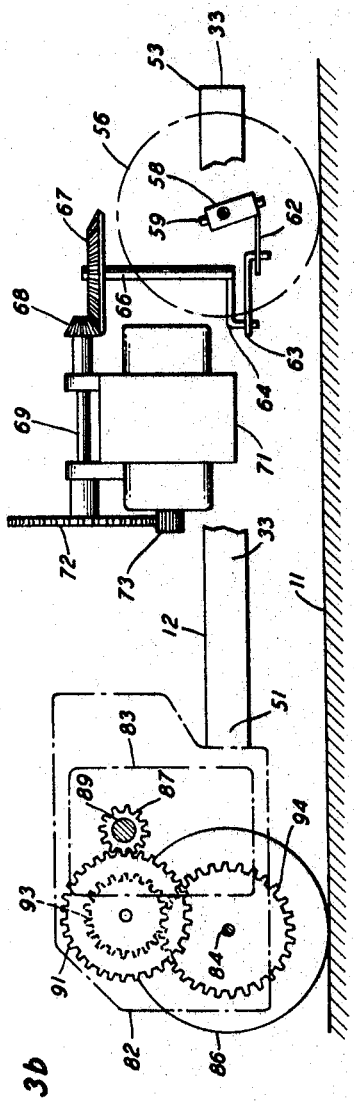
Figure 3C:
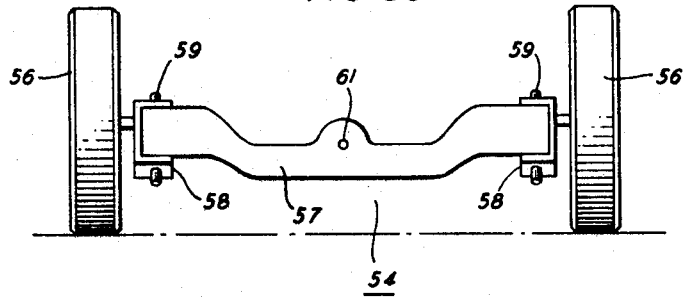
FIG. 3c is a view of the front axle of the vehicle.

The construction of an illustrative model vehicle 12 for use in the practice of the invention is shown in detail in FIGS. 3a through 3c wherein the plate 33 constitutes the frame of the vehicle upon which a standard model automobile body or the like can be conveniently mounted for purposes of simulation. The plate 33 is expanded laterally at its posterior end 51, its midportion 52 is tapered anteriorly and is continuous with a laterally narrower front or anterior end 53. The front wheel assembly 54 comprises the front wheels 56 mounted on the axle 57 and rotatably secured thereto by means of the steering knuckles 58 which are fixedly mounted on the lateral ends of the axle 57 by means of the king pins 59. The axle 57 is pivotally mounted on the plate or frame 33 by means of the swivel 61. Steering arms 62 are connected at their forward ends to the lower posterior ends of the steering knuckles 58. At their opposite ends the steering arms 62 are rotatably linked to the vertically disposed ends of a tie rod 63 which is adapted to move laterally thus pulling, for example, the left steering arm toward the central axis of the vehicle 12 while pushing the right steering arm away from the central axis, thus effecting a change in the orientation of the wheels 56 and thus in the direction of the vehicle 12, the vehicle turning to the left in this instance when it is in motion. If the tie rod 63 is moved to the left an opposite effect is had and the vehicle 12 is turned to the right when in motion. The tie rod 63 is actuated by a curved arm 64 which is fixedly attached to a rotatably mounted vertical shaft 66 which at its upper end connects with suitable gearing and a steering motor. The vertical shaft 66 provides the axis for and is driven by a straight bevel gear 67 of a gear reduction assembly which is in turn rotated by the pinion 68 positioned at the front end of a gear shaft 69 rotatably mounted on the housing of a steering motor 71. The gear shaft 69 forms the axis of a straight spur gear 72 which coacts with a pinion 73 attached to and actuated by the shaft (not shown) of the steering motor 71 which is mounted directly on the frame 33. The steering motor 71 is desirably a permanent magnet, 6-volt, DC motor wired through relay contacts (not shown) so that it is driven clockwise when the relay is open and counterclockwise when the relay is closed. The clockwise rotation of the motor 71 may, illustratively, turn the front wheels 56 to the right, while counterclockwise rotation of the motor 71 turns the wheels 56 to the left by means of the gear reducing means and various linkages described above. The electrical circuitry of the vehicle 12 which controls the relay contacts of the motor 71 will be described hereinafter.

In addition, it is desirable, although not essential, to include apparatus such as springs, castering, or the like which act to return the front wheels 56 to their neutral position in which they are positioned parallel to the longitudinal axis of the vehicle 12. Thus, springs and the inertia of the system can be utilized to position the wheels 56 as desired.

Figure 4:
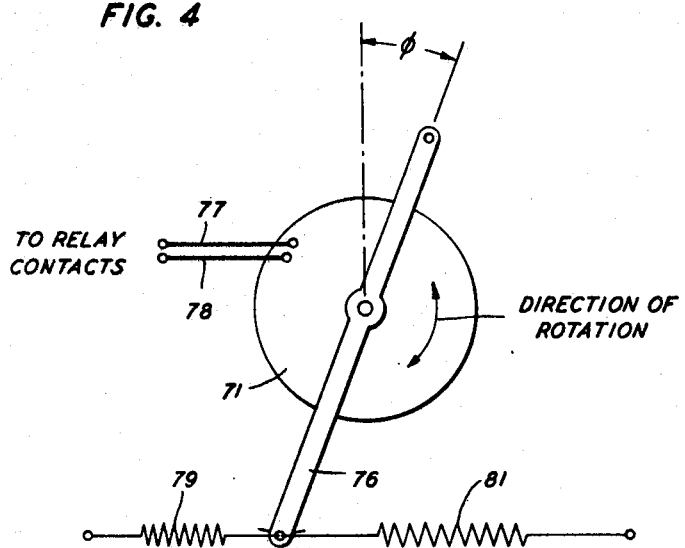
FIG. 4 is a diagram of a suggested steering arrangement for the vehicle of FIG. 3.

Alternative apparatus for accomplishing a similar result is illustrated in FIG. 4 of the drawings where a rotary arm 76 mounted to the steering motor 71 and the front wheel assembly 54 is so positioned that it is subject to the clockwise and counterclockwise forces to which the front wheel assembly 54 is subject when the relay to the steering motor 71 is closed or open as noted above. The wires 77, 78 to the relay contacts from the steering motor 71 are shown diagrammatically in FIG. 4. The rotary arm 76 is attached at one end to the front wheel assembly 54 through suitable linkages and gearing and at its opposite end to springs 79, 81. As shown in FIG. 4, the rotary arm 76 is deflected from the vertical. The degree of deflection is proportional to the degree to which the front wheels 56 in FIG. 3 are deflected from the neutral or unturned straight ahead position. The repetition rate of the relay is constant and the duty cycle, referring to the proportion of the cycle during which the relay is closed, is controlled remotely, as described hereinafter, by the operator of the vehicle 12. Thus, for a given duty cycle the rotary arm 76 assumes a degree of deflection from the vertical such that the net force of the motor when averaged over a complete cycle is counterbalanced by the net spring force when the repetition rate is sufficiently high so that the inertia of the system has a substantial effect. For lesser repetition rates, the rotary arm 76 will vibrate about this same degree of deflection from the vertical state. An alternative means for accomplishing steering is to mount a clockspring on gear shaft 69 such that when the shaft is driven clockwise, for example, by applying electrical power to the motor the spring will be tightened and when no power is applied the spring will unwind and drive the shaft counterclockwise. Thus relay contacts for reversing the motor are not needed.

Disposed behind the steering motor 71 and the various gears and the linkages associated with the front wheel assembly 54 is the pickup area in which are the pickups 22, 23 screwed or otherwise attached to the frame 33 as described heretofore.

Attached to the posterior end of the frame 33 as shown in FIGS. 3a and 3b are the rear wheel and drive motor assembly mountings 82, between and by which drive motor 83 is supported. The drive motor 83 is desirably a 12-volt direct current motor. The rear axle 84 is rotatably disposed on the mountings 82, and the rear wheels 86 are fixedly engaged upon the opposite ends of the axle 84. A driver gear 87 of a compound gear train 88 is mounted on the shaft 89 of the drive motor 83 and coacts with the greater gear 91 at a like speed, actuating the driver gear 94 which has as its shaft and axis the rear axle 84 which rotates to turn the rear wheels 86, propelling the vehicle 12.

Before discussing the electrical system which leads to control of the vehicles, both as to speeed and direction, it is necessary to consider first the pickup arrangement by which control voltages are applied from the control center 18 through the strip conductors 14, 16 to the control motors 71 and 83 of the vehicle. As pointed out before, one of the principal features of the present invention is a pickup arrangement which not only transmits control signals to the vehicle but also the power for the motors, regardless of vehicle orientation. As shown in FIG. 1, alternate conductors are connected to opposite sides of the power source 18, hence the pickup arrangement must not be such as to short out two adjacent conductors in any attitude of the car. Additionally, since the present invention is directed to a system in which the cars may be made to go in any direction, in straight lines, or in circles at the command of the manipulator of the controls, it is necessary that the pickup arrangement be in contact with any pair of adjacent conductors at all times.

Figure 5:
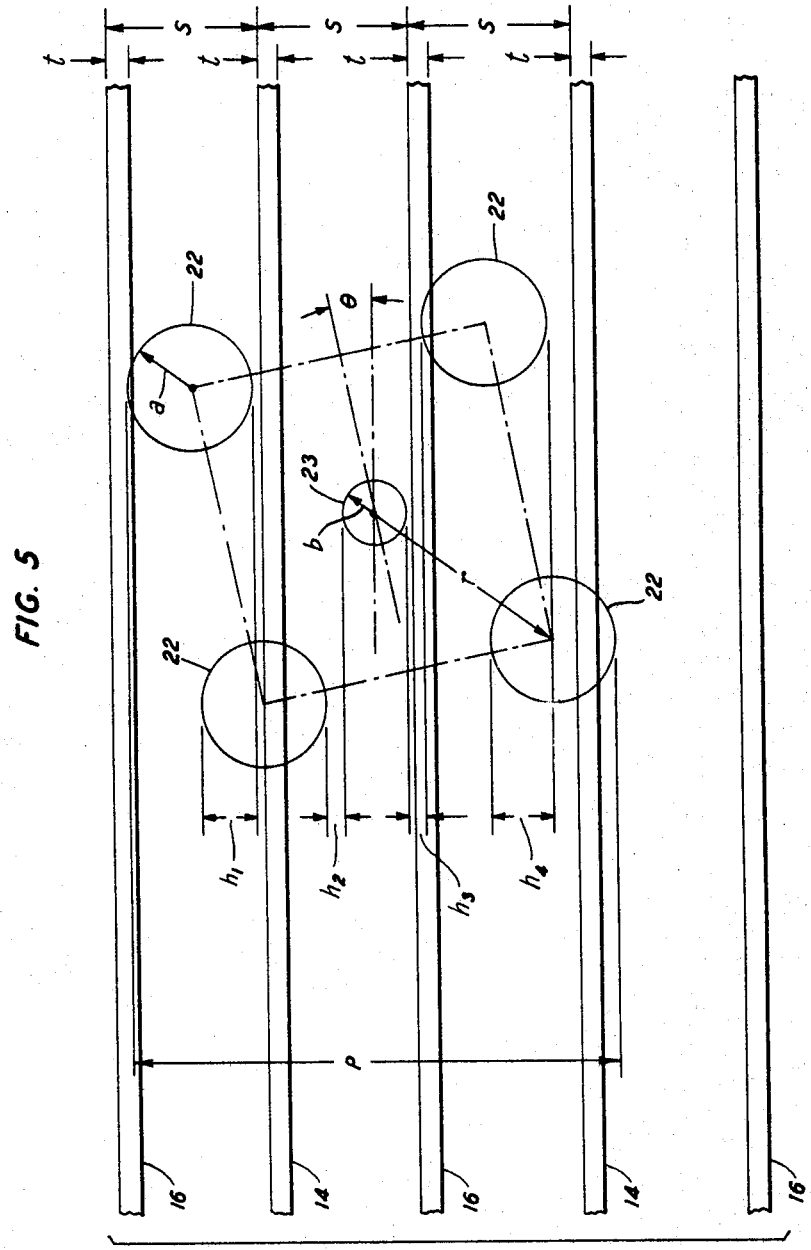
FIG. 5 is a plan diagrammatic view of a roadway and pickup arrangement embodying the principles of the invention.

In FIG. 5 there is shown the geometrical arrangement of the pickup system of FIGS. 1 and 2. The conductors 14, 16 of the roadway has a thicknesss $t$, are parallel, and are spaced apart a center-to-center distance $s$. The pickup arrangement has four pickups 22 of radius $a$ disposed at the four corners of a square, with the center of each pickup at a distance $r$ from the center of the square. The center-to-center spacing of any two adjacent pickups 22 along the sides of the square is, therefore $\sqrt{2}r$. At the center of the square is a fifth pickup 23 of radius $b$. For purposes of this analysis we define an angle $\theta$ as the angle between a line through the center of the square parallel to the conductors 14, 16, and the perpendicular bisector of one side of the square, as shown in FIG. 5. Because of the symmetry of the arrangement, a range of values of $\theta$ from 0° to 45° covers all possible angular orientations of the vehicle with respect to the roadway.

We define the projection of the outermost extremities of the pickup arrangement on a line perpendicular to the conductors 14, 16, as having a length P, which is, of course, a function of the angle $\theta$. Thus for $\theta=0°$, $P=\sqrt{2}r+2a$; and for $\theta=45°$, $P=2r+2a$. Within the length P there are certain projected gaps or holes representing distances over which there is no projected pickup. As shown in FIG. 5, the distances $h_2$ and $h_3$ are gaps, while the other possible gaps $h_1$ and $h_4$ negative, i.e., they are included within the projections of the individual pickups. On the other hand, for $\theta=45°$, $h_1$ and $h_4$ actually exist, i.e., have positive values. Within the range of $\theta$ between 0° and 45°, these are the only gaps that can possibly exist. Because of symmetry, for any value of $\theta$ within this range, $h_1=h_4$ and $h_2=h_3$.

For any operative pickup system used in conjunction with the roadway depicted, it can now be seen that certain general conditions must be met. These are:

(I) The projected length (or diameter) or each pickup must always be less than the distance $s-t$, which insures that neighboring conductors 14, 16 cannot be shorted out. By the same token, no two pickups can touch each other since they would then appear as a single pickup, the projected length of which could be greater than $s-t$;

(II) The projected length P for any value of $\theta$ must greater than $2s-t$, thereby insuring that regardless of the vehicle orientation and position, one each of conductors 14 and 16 is contacted and thus both sides of control source 18 are contacted;

(III) Every projected gap or hole $h_1$, $h_2$, $h_3$, and $h_4$, when it exists at all, that is, when it is positive, must have a projected length less than $t$, thereby insuring that every conductor 14, 16 included in the length P is contacted by the pickup system.

From the foregoing, it is now possible to write down the appropriate conditions for the arrangement of FIG. 5 to assure its proper operation.

$$2a<(s-t) \tag{1}$$
$$2b<(s-t) \tag{2}$$
$$a+b<r \tag{3}$$
$$2a<\sqrt{2}r \tag{4}$$
$$P=2r \sin (45°+\theta)+2a>(2s-t) \tag{5}$$
$$h_1=h_4=\sqrt{2}r \sin \theta -2a<t \tag{6}$$
$$h_2=h_3=r \sin (45°-\theta)-a-b<t \tag{7}$$

As pointed out before, $h$ may be negative, in which case the inequalities of (6) and/or (7) are clearly satisfied. In considering inequalities, it is necessary to consider only the worst possible case. If the worst case satisfies the inequality, all other cases do also. Thus, in (5) we consider only the case where P is a minimum, which occurs at $\theta=0°$. In (6) and (7) we consider only the cases where $h$ is a maximum, which occurs at $\theta=45°$ for (6) and $\theta=0°$ for (7).

Let us now consider cases (1), (4), (5), and (6), which do not contain the parameter $b$. For simplicity we set $a'=a+t/2$ and $s=1$. Inequalities (1), (4), (5), and (6) then become respectively $$a'<½ \tag{1'}$$
$$a'<r/\sqrt{2}<r\sqrt{2}+t/2(t\geq 0) \tag{4'}$$
$$\sqrt{2}r+2a'>2(\theta=0) \tag{5'}$$
$$r<2a'(\theta=45°) \tag{6'}$$

Figure 6:
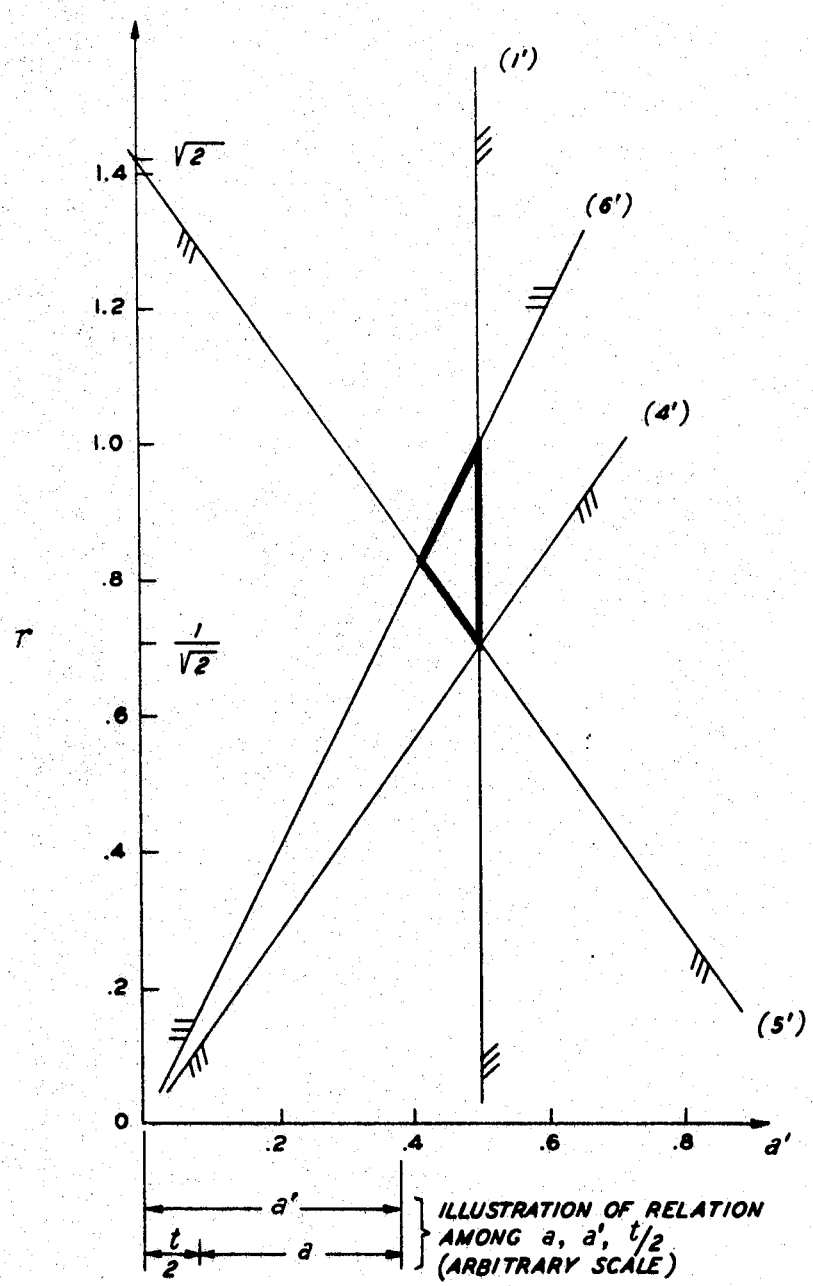
FIG. 6 is a graph denoting certain parametric variations of the arrangement of FIG. 5.

These four inequalities are plotted in FIG. 6. The area which satisfies all four inequalities is defined by the interior of the triangle outlined in heavy lines. The vertices of this triangle are, from FIG. 6 at $a'=½, r=1$; $a'=\sqrt{2}-1, r=2(\sqrt{2}-1)$; and $a'=½, r=1\sqrt{2}$. We note also a constraint on $a'$. When $t/2$ is greater than 0.414, that is $\sqrt{2}-1$, $a'$ must lie to the right of $t/2$ in the graph of FIG. 6 in order that it have a positive value, i.e., the pickup has a positive radius. By the same token, $t/2$ cannot exceed ½.

Next we consider the inequalities (2), (3), and (7). For simplicity, we let $b'=b+t/2$. Using (2) and (3) for the upper limit on $b'$ and (7) for the lower limit, and setting $s=1$ as before we obtain $$\text{minimum } [½, r-a'+t]>b'>\frac{r}{\sqrt{2}}-a' \tag{8}$$

It is necessary to prove that the upper limit exceeds the lower limit, which is done by proving that their difference is positive. Considering the terms which make up the upper limit separately, we have $$1/2\left(\frac{r}{\sqrt{2}}-a'\right) > a' + a' - \frac{r}{\sqrt{2}}$$

$$> r - \frac{r}{\sqrt{2}}$$

$$= r\left(1 - \frac{1}{\sqrt{2}}\right) > 0 \qquad (9)$$

and $$(r-a'+t) - \left(\frac{r}{\sqrt{2}} - a'\right) = \left(1 - \frac{1}{\sqrt{2}}\right)r + t > 0 \qquad (10)$$

In order that the radius $b$ be non-negative, the $b'$ which satisfies the foregoing must also satisfy $b' \geq t/2$ which will obtain if the upper bound or limit on $b'$ equals or exceeds $t/2$;

$$\frac{1}{2} \geq t/2 (s=1) \qquad (11)$$

$$r - a' + t > \sqrt{2}a' - a' + t = (\sqrt{2} - 1)a' + t > t \geq t/2 \qquad (11)$$

From the foregoing it is clear that it is possible to choose a $b'$ that is compatible with the values or $r$ and $a'$ as shown in FIG. 6, thus the worst case of all of the inequalities (1) through (7) can be satisfied and the arrangement of FIG. 5 therefore satisfies the criteria I through III.

The pickup system of FIG. 5 is a preferred arrangement inasmuch as it is operable for any possible orientation of the car on the roadway. It is possilbe to design other pickup arrangements which satisfy criteria I through III at least for most orientations or a range of orientations. Experience has shown, however, that the arrangement of FIG. 5 is completely reliable.

The foregoing discussion and development can be readily extended to include roadways having curved conductors as well as straight conductors, or curved conductors exclusively. The same principles apply and a triangle of acceptable $r$ and $a'$ similar to that of FIG. 6 can readily be established for radii of curvature which are large compared to the dimension $r$.

As an example of practical dimensions for a pickup arrangement, as utilized in a working model, $r=0.59$ inch, $2a=0.54$ to $0.56$ inch, and $2b=0.36$ inch. For the roadbed, $s=0.70$ inch and $t=0.04$ to $0.05$ inch. The entire pickup assembly was rotated 26° to the centerline of the vehicle to maximize the number of pickups in contact with the roadway conductors when the vehicle is aligned parallel to the conductors. Individual leads are connected from the posts 31 of the pickups to the appropriate electrical circuitry, which will be discussed hereinafter.

The contact arrangement discussed in the foregoing provides a virtually complete and constant connection between the conductors of the roadway and the electrical circuits in the car, to be discussed hereinafter. Momentary loss of electrical contact may occasionally occur as a result of corrosion, dirt, contact hop, or the like. These interruptions are insufficient to affect materially the movement and control of the vehicle inasmuch as inertia carries the vehicle past these points into renewed areas of contact.

While the foregoing discussion has dealt with the case of parallel conductors forming the roadway, other possible arrangements such as a checkerboard or triangular pattern may possibly be used. For a pickup arrangement meeting the necessary criteria set forth heretofore (or their counterparts, depending on the roadway configuration) it is essential that symmetry be observed. Within this limitation, large numbers of roadway conductor shapes or patterns are possible.

With a pickup arrangement meeting the criteria set forth, various control systems may be used. For clarity, a single vehicle control system will first be described, after which a multiple vehicle system will be discussed. Whatever the type of control system used, direct positive control of the vehicle at all times is made possible through the pickup and roadway system.

It is to be understood that the following described control and operating circuits are by way of illustration only.

The electrical system of the vehicle 12 activating the steering motor 71 and the drive motor 83 emanates from the pickups 22, 23 which contact the conductors 14, 16 of the driving surface 11. The conductors 14, 16 are wired to the remote control and power source 18. The electrical circuitry within the vehicle 12 is considered initially in one illustrative embodiment by reference to FIG. 7 of the drawings, by means of which one vehicle 12 is operated at a time. The circuitry is distributed on the frame 33. The pickups 22, 23 are connected by the leads 101 to the junctions 102 which are in turn connected by the leads 103 and 104 to a plurality of oppositely poled diodes 106 and 107. Power supplied to the conductors 14, 16 and thus to the pickups 22, 23 preferably accords with the waveform illustrated in FIG. 8 and discussed below but need not be rectified, since the diodes 106, 107 will rectify the power received. Diodes 106 are connected through a lead 108 to a positive terminal 109 and diodes 107 are connected through a lead 111 to a negative terminal 112, as shown.

Figure 8:
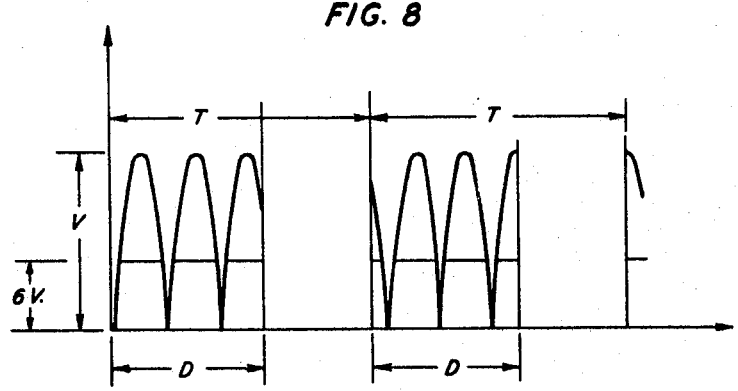
FIG. 8 is a diagram of voltage waveforms for the circuit of FIG. 7.

As thus far described, the circuitry, which includes the pickups 22, 23, and diodes 106, 107, imparts a great degree of flexibility to the system. Thus whether the control and power signals are both alternating current or one is direct current while the other is alternating, the diode arrangement insures that only direct current appears at terminals 109 and 112. Inasmuch as there are commercially available types of control systems that can be adapted to the present arrangement, the pickup-diode system makes possible their use. The positive terminal 109 is connected through a diode 113 to one side of drive motor 83. The diode 113 isolates back voltage generated by the motor 83 when the vehicle 12 is permitted to coast during the off part of the duty cycle (see FIG. 8). The negative terminal 112 is connected to the other side of the drive motor 83. When the voltage across the positive and negative terminals, 109 and 112 respectively, is modulated for amplitude and duty cycle as illustrated in FIG. 8, the power provided to the drive motor 83 is proportional to the applied voltage V averaged over a complete cycle, according to the formula, $VD/T$, where D is a separately adjustable portion of a complete duty cycle, and T is a fixed cycle. Accordingly if D is varied, the power transmitted to the drive motor 83 can be held constant by changing V, or if D is held constant, the power can be varied by changing V. Thus the velocity control from center 18 may be A.C. or D.C. varied as to voltage, duty cycle, or both.

Figure 7:
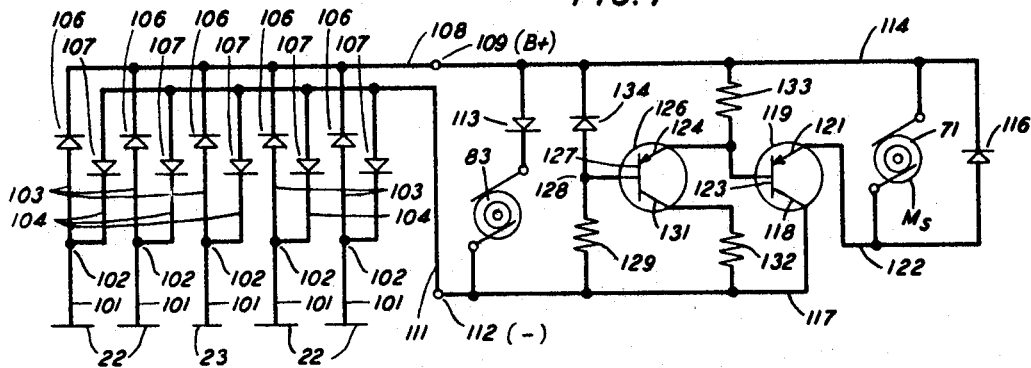
FIG. 7 is a schematic view of certain electrical circuitry for use with the invention.

The remainder of the circuitry shown in FIG. 7 involves the steering motor 71. The positive terminal 109 is connected by the lead 114 to one side of the steering motor 71, and to a voltage regulator diode 116 connected across motor 71 as shown. The negative terminal 112 is connected by the lead 117 to the collector 118 of a power transistor 119. The emitter 121 of the transistor 119 is connected to the other side of the steering motor 71 by the lead 122 as shown. The power transistor 119 is illustratively and preferably of the PNP variety. The base 123 of the transistor 119 is connected to the emitter 124 of a second transistor 126 again, for example, of the PNP type, the base 127 of which is connected to a junction 128, and through a resistor 129 to the lead 117 and hence the collector 118 of the power transistor 119. The collector 131 of the second PNP transistor 126 is connected to the lead 117 through a resistor 132. The emitter 124 of the transistor 126 is connected to the lead 114 through a resistor 133. Junction 128 is connected to lead 114 through a Zener diode 134. The voltage across the Zener diode is the same as that across the steering motor 71, for example, 6 volts, during the portion D of a cycle (illustrated in FIG. 8) regardless of how much the applied voltage V exceeds 6 volts. The two transistors 119 and 126 amplify to provide the power at this voltage. During the remainder of a cycle the voltage is zero. Thus, the power to the steering motor 71 is pulsed and depends on D, and the steering is effected by the motor 71 as described heretofore.

Figure 9:
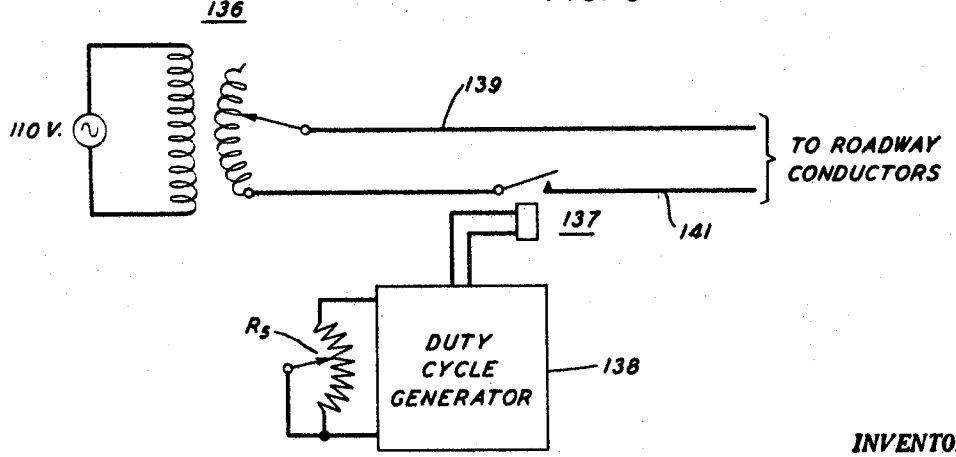
FIG. 9 is a schematic of certain control circuitry for use with the invention.

As noted, the power supplied to the pickups 22, 23 can be alternating current which is rectified by the diodes 106, 107. Suitable means for supplying power in this manner is shown in FIG. 9. The power source involves a variable transformer 136 in which the primary voltage is 110 volts alternating current, and the maximum secondary voltage is, according to the preferred embodiment, about 24 volts, alternating current, for example. The transformer 136 is operated in concert with a relay 137 and a variable duty cycle generator 138 which controls the winding of the relay 137. The leads 139 and 141 connect the transformer 136 and the relay 137 to the roadway conductors 14, 16. The control knob (not shown) of a standard duty cycle generator 138 such as emloyed with the relay 137 can be linked to the base (not shown) of a conventional transformer 136 so that when the knob is rotated the transformer is rotated. The link is desirably so arranged that when D, that portion of the duty cycle during which the relay is open as characterized above, and as shown in FIG. 8, is increased, V, the applied voltage, is decreased and the converse is also true. It is noted that by rotation of the transformer 136 with the control arm fixed the output voltage of the transformer is modified accordingly. The circuitry of the duty cycle generator 138 is constructed to control the values represented by V and D rather than velocity or speed and steering.

Figure 10:
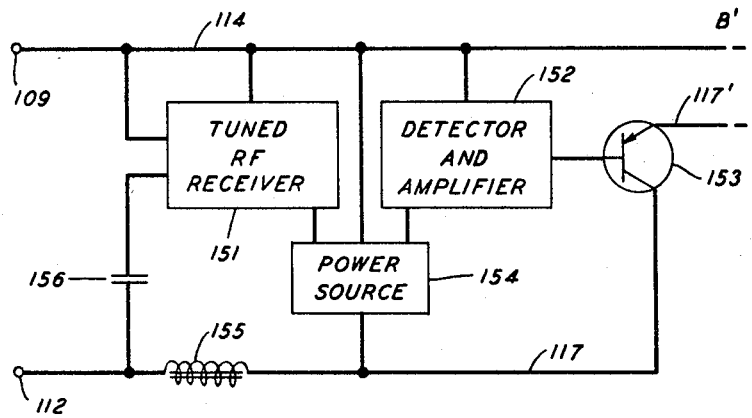
FIGS. 10, 11 and 12 are schematics of various circuits for use with the invention.
Figure 11:
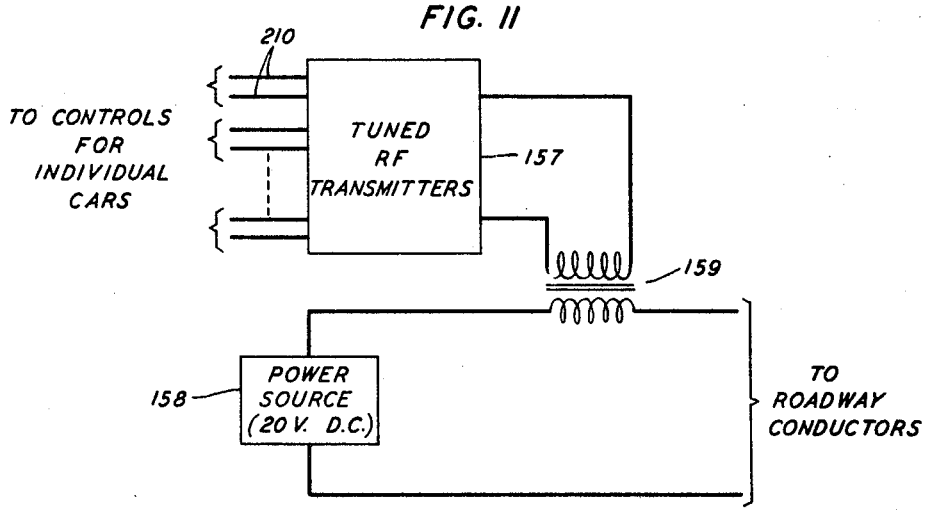

As noted, the circuitry described in FIG. 7 is limited in its usefulness to a single vehicle at a time and is primarily shown for purposes of illustrating the flexibility of the pickup-diode system. The system can be readily modified so that a plurality of vehicles are moved by the remote power and control source 18 along the surface of the roadway. This can be accomplished as shown in FIG. 10 by inserting a radio frequency (R–F) receiver 151 in series with the circuit shown in FIG. 7 between the positive and negative terminals, 109 and 112 respectively. The receiver is capable of taking an R–F signal picked up by the pickups 22, 23 in the form of a modulated R–F carrier, detecting and amplifying it in a detector and amplifier 152, and applying it to the base of a power transistor 153. A power source 154 supplies the power to the receiver 151, detector 152, and transistor 153. The emitter output of transistor 153, designated 117′, is connected to the one side of motor 83 of FIG. 7. An R–F choke 155 and a D–C blocking capacitor 156 serve to isolate transistor 153 and receiver 151 from A–C and D–C currents respectively. The output of the circuit of FIG. 10 is an amplitude and duty cycle modulated voltage which has exactly the same effect as that described with respect to the circuitry of FIG. 7, except that several vehicles are operated simultaneously when the R–F receivers are tuned to different frequencies; one such frequency being sufficient to carry the control information is a 100 kilocycle signal. A stationary control and power source 18 for use with the R–F system of FIG. 10 is shown in the block diagram in FIG. 11, wherein tuned R–F transmitters 157 are set up in association with, for example, a 20-volt direct current power source 158 by means of the transformer 159.

Circuitry may also be used in the practice of the invention in which the steering of the vehicle is controlled by the duty cycle and the speed is controlled by the repetition rate of an averaging cycle. In the averaging circuit the output of an NPN transistor is a pulse of fixed length which is generated every time the relay closes on the make contact. The rest of the averaging circuit averages out these pulses and amplifies their average power.

A particularly desirable control system for the control of velocity and steering in concert with the unique system of electrical pickups 22, 23, as shown in FIG. 5, is a commercially available system for the automatic simultaneous control of a number of model trains.

Figure 12:
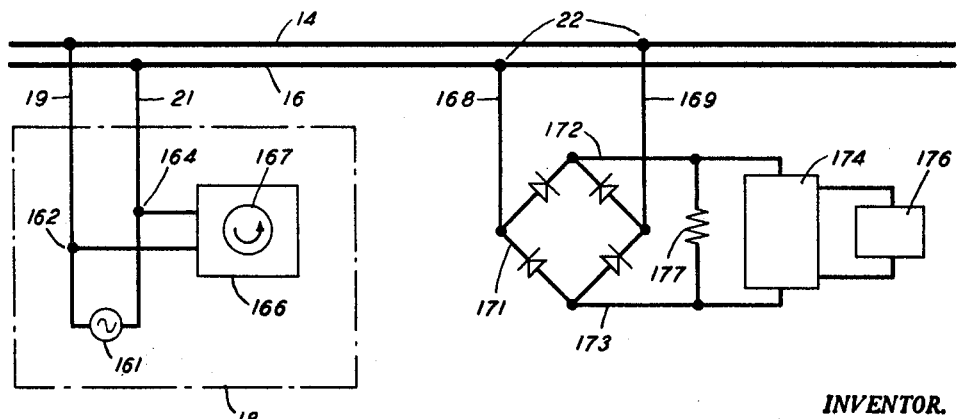
Figure 13:
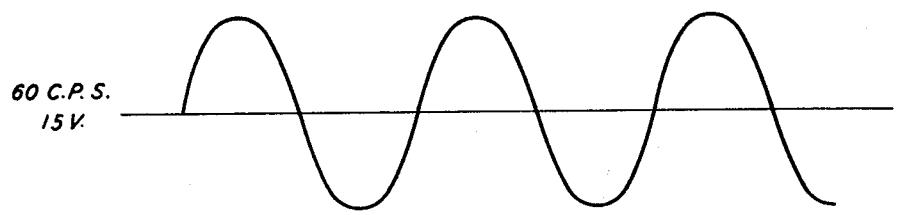
FIG. 13 is a diagram of certain of the voltages in the circuits of FIG. 9 through 13.
Figure 14:
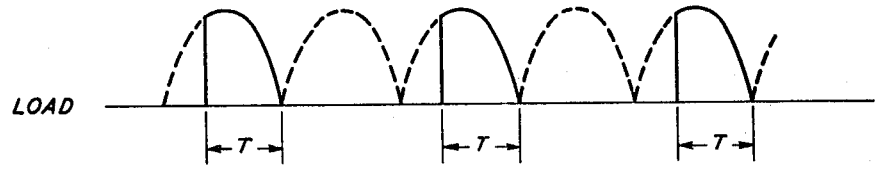

The integration of this system into the practice of the present invention is illustrated simply in FIG. 12 with respect to a single channel employing a single pair of roadway conductors 14, 16 and the circuitry of a single vehicle 12. The system normally makes five channels available with carrier signals of 100, 140, 180, 220 and 255 kilocycles. The use of silicon controlled rectifiers as microreceivers provides for small units, conveniently mounted within the vehicle and attached in any convenient manner on the frame 33. As shown in the diagrammatic representation of FIG. 12, there is provided a system of control and steering that comprises a remote stationary power source 161 of, for example, 15 volts, 60 cycles per second, connected to junctions 162 and 164 and thence to the conductors 14, 16 by means of the leads 9, 21. A high frequency control transmitter 166 having a control knob 167 is also connected to the junctions 162 and 164. The leads 19 and 21 connect the remote or stationary power source and control unit 18 to the roadway conductors 14, 16 which in turn communicate with the pickups 22, 23 which, through the leads 168, 169, connect with diode bridge 171 mounted in the vehicle. The diode bridge 171 is used for purposes of illustration and is equivalent to and serves the same function as the distribution of diodes shown, for example, in FIG. 7. A pair of leads 172 and 173 connect with a control receiver 174 which directs the drive and steering motors, 83 and 71 respectively (not shown). The carrier current is transmitted between the conductors 14, 16 through the bridge 171 and receiver unit 174. The output of unit 174 passes to the motors 71 and 85, shown diagrammatically as load 176. A resistor 177 is connected across bridge 171 and enables the carrier current to be transmitted through the diode bridge at all times, when the system is in operation. FIG. 13 shows the voltage wave at the power source 18 in FIG. 12. FIG. 14 shows the voltage across the load 176 in FIG. 12. The control knob 167 on the control transmitter 166 is adjustable so that the time T indicated in FIG. 14 can be varied from zero to almost a half wave of the 60-cycle per second voltage of source 18, i.e., $\frac{1}{120}$ second. The system does this by sending out a carrier wave after the initiation of the 60 cycle half-wave, the delay being set by the control on the transmitter 166, and the carrier triggers a silicon controlled rectifier (not shown) in the receiver unit 174. The silicon controlled rectifier remains in conduction until the end of the half-wave. Only one trigger per cycle, $\frac{1}{60}$ second, can be sent.

Commercially available carrier current systems which offer large numbers of channels may expeditiously be utilized in which for each vehicle two channels are used, one for velocity control and one for steering control. In this case, of course, two receivers must be mounted in the vehicle. With present day technology, this poses no problem inasmuch as complete receiver circuits may be made extremely small.

Form the foregoing it can readily be seen that the present invention makes possible an extremely versatile and realistic model car racing system, for example. With the roadway and pickup arrangement of the present invention, and the diodes associated with the pickups, any of a large number and variety of control systems may be used, with no restraints on the direction of motion of the vehicles.

The foregoing discussion has been intended to illustrate the features and principles of the present invention. Numerous other embodiments or arrangements may occur to workers in the art without departure from the spirit and scope of the present invention.

What is claimed is:

1. A vehicle system comprising, in combination, a roadway surface, a vehicle for operation on said surface, and an electrical control station, said roadway surface having a plurality of spaced conducting members symmetrically arranged and insulated from each other by insulating material, said conductors and insulating material forming a substantially smooth surface upon which said vehicle rides, said conductors being alternately connected to points of opposite polarity on said control station, said vehicle having a driving mechanism and a steering mechanism therein, said control center comprising a source of electrical signals for said driving and steering mechanisms for application to said vehicle through said conductors, and a pickup arrangement mounted on said vehicle for slideably engaging the surface of said roadway, said pickup arrangement comprising a plurality of pickups so arranged and dimensioned that the maximum dimension of that portion of any pickup in contact with the roadway is less than the spacing between conductors in said roadway, the minimum dimension of that portion of the pickup arrangement in contact with said roadway surface is greater than twice the center to center distance between adjacent conductors in said roadway surface less the thickness of a single conductor, and the maximum dimension of any portion of the roadway surface not contacted by the pickup arrangement during movement of the vehicle over the roadway surface is less than the minimum dimension of any conductor on said roadway surface.

2. A vehicle system as claimed in claim 1 wherein said roadway surface comprises a plurality of longitudinally extending parallel conducting strips having a thickness $t$ and a center-to-center spacing $s$.

3. A vehicle system as claimed in claim 2 wherein said pickup arrangement comprises a plurality of spaced circular pickups having a radius $a$, where $2a < (s-t)$.

4. A vehicle system as claimed in claim 2 wherein said pickup arrangement defines a square and comprises four circular pickups oriented at the four corners of the square and having a radius $a$, a single circular pickup having a radius $b$ at the center of the square, the center of each of said four pickups being located a distance $r$ from the center of the square, the dimensions being so related that $$2a < (s-t)$$
$$2b < (s-t)$$
$$(a+b) < r$$
and
$$2a < \sqrt{2r}$$

5. A vehicle system as claimed in claim 4 in which the projected length P of the pickup arrangement onto a line perpendicular to the logitudinal direction of said conductors contain gaps $h_n$ which represents regions in which there is no contact with said roadway, and $$P = 2r \sin (45° + \theta) + 2a > (2s-t)$$
$$h_1 = h_4 = \sqrt{2}r \sin \theta - 2a < t$$
$$h_2 = h_3 = r \sin (45° - \theta) - a - b < t$$

where $\theta$ is the angle between the longitudinal direction of the roadway conductors and an axis of said pickup arrangement.

6. A vehicle system comprising, in combination, a roadway surface, a vehicle for operation on said surface, and a source of electrical control signals and power for said vehicle, said roadway surface having a plurality of spaced conducting members symmetrically arranged and insulated from each other by insulating material, said members and said material forming a substantially smooth surface upon which said vehicle rides, alternate ones of said conductors being connected to opposite sides of said source, said vehicle having a driving direct current motor and a steering direct current motor therein, the output of said source including both control signals and power for said motors for application to said vehicle through said conductors, a pickup arrangement mounted on said vehicle for slideably engaging the surface of the roadway, said pickup arrangement comprising a plurality of pickups so arranged and dimensioned that the maximum dimension of that portion of any pickup in contact with the roadway is less than the spacing between conductors in said roadway, the minmum dimension of that portion of the entire pickup arrangement in contact with said roadway surface is greater than twice the center to center distance between adjacent conductors in said roadway surface less the thickness of a single conductor, and the maximum dimension of any portion of the roadway surface not contacted by the pickup arrangement during movement of the vehicle over the roadway surface is less than the minimum dimension of any conductor on said roadway surface, and a bridge network within said vehicle connected between said pickups and said motors for producing direct current power for said motors.

7. A vehicle system as claimed in claim 6 wherein said bridge network comprises a pair of oppositely poled diodes connected in parallel to each other and in series between each of the pickups of said arrangement and said motors.

References Cited
UNITED STATES PATENTS

| | | | |
|---|---|---|---|
| 2,717,557 | 9/1955 | Steyffer | 104—149 X |
| 2,850,987 | 9/1958 | Epergue | 104—149 |
| 3,205,618 | 9/1965 | Heytow | 46—244 |
| 3,339,307 | 9/1967 | Floyd et al. | 46—244 |

FOREIGN PATENTS 702,764  1/1954  Great Britain.

LOUIS G. MANCENE, *Primary Examiner.*

R. F. CUTTING, *Assistant Examiner.*